(12) United States Patent
Park et al.

(10) Patent No.: US 7,492,406 B2
(45) Date of Patent: Feb. 17, 2009

(54) METHOD OF DETERMINING CLARITY OF AN IMAGE USING ENLARGED PORTIONS OF THE IMAGE

(75) Inventors: Myoung-hoon Park, Seongnam-si (KR); Kyoung-shin Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 648 days.

(21) Appl. No.: 11/011,008

(22) Filed: Dec. 13, 2004

(65) Prior Publication Data

US 2005/0128333 A1 Jun. 16, 2005

(30) Foreign Application Priority Data

Dec. 15, 2003 (KR) ...................... 10-2003-0091341

(51) Int. Cl.
*H04N 5/222* (2006.01)
*H04N 5/262* (2006.01)

(52) U.S. Cl. ............................... 348/333.05; 348/240.2

(58) Field of Classification Search .............. 348/240.2, 348/333.01, 333.02, 333.04, 333.05, 333.11, 348/333.12, 346; 382/298, 299
See application file for complete search history.

(56) References Cited

U.S. PATENT DOCUMENTS 5,739,857 A * 4/1998 Kaneda ....................... 348/349

| | | | | |
|---|---|---|---|---|
| 6,512,548 B1 * | 1/2003 | Anderson | .............. | 348/333.05 |
| 6,812,967 B1 * | 11/2004 | Niikawa et al. | ......... | 348/333.05 |
| 7,343,052 B2 * | 3/2008 | Roth et al. | ................... | 382/299 |
| 2002/0025084 A1 * | 2/2002 | Yang et al. | ................... | 382/299 |
| 2003/0160874 A1 * | 8/2003 | Kuroiwa | .................. | 348/220.1 |
| 2003/0160886 A1 * | 8/2003 | Misawa et al. | .............. | 348/347 |
| 2005/0083426 A1 * | 4/2005 | Yoo et al. | .............. | 348/333.05 |
| 2006/0093207 A1 * | 5/2006 | Reicher et al. | .............. | 382/156 |

FOREIGN PATENT DOCUMENTS

| JP | 11-196301 A | | 7/1999 |
|---|---|---|---|
| JP | 11196301 A | * | 7/1999 |
| KR | 10-2004-0065786 A | | 7/2004 |

* cited by examiner

*Primary Examiner*—Timothy J Henn
(74) *Attorney, Agent, or Firm*—Drinker Biddle & Reath LLP

(57) ABSTRACT

A method of controlling a digital photographing apparatus in which a portion of an input image is enlarged and displayed as a display image on an image displaying unit so that a user may determine the clarity of the input image. The digital photographing apparatus receiving the input image having a resolution of a first pixel number and displaying the display image on the image displaying unit having a resolution of a second pixel number. The method includes: receiving the input image; and deciding on an enlarged display region that is to be enlarged from the input image, setting the enlarged display region into at least two display images, and continually displaying the display images on the image display unit.

10 Claims, 10 Drawing Sheets

METHOD OF DETERMINING CLARITY OF AN IMAGE USING ENLARGED PORTIONS OF THE IMAGE

BACKGROUND OF THE INVENTION

This application claims the priority of Korean Patent Application No. 2003-91341, filed on Dec. 15, 2003, in the Korean Intellectual Property Office, the disclosure of which is incorporated herein in its entirety by reference.

FIELD OF THE INVENTION

The present invention relates to a method of controlling a digital photographing apparatus (e.g., a digital camera), and more particularly, to a method of controlling a digital photographing apparatus that receives an image having a resolution with a first pixel number and displays a display image on a displaying unit having a resolution with a second pixel number.

The method of controlling the digital photographing apparatus of the present invention can be adopted in any digital photographing apparatus that captures and stores images in addition to digital cameras. In the present application, a digital camera is used as a typical example in which the present invention can be adopted.

DESCRIPTION OF THE RELATED ART

FIG. 1 is a front perspective view of a conventional digital camera 1. Referring to FIG. 1, the digital camera 1 includes on its front surface, a microphone MIC, a self-timer lamp 11, a flash 12, a shutter button 13, a mode dial 14, a function-select button 15, a photograph information display unit 16, a view finder 17a, a function-block button 18, a flash-light amount sensor (FS) 19, a lens unit 20, and an external interface unit 21.

When in a self-timer mode, the self-timer lamp 11 operates when the shutter button 13 is pressed until a shutter (not shown) operates. The mode dial 14 is used to select one of various operating modes, for example, a still image photographing mode, a night scene photographing mode, a moving picture photographing mode, a reproducing mode, a computer connecting mode, and a system setting mode. The function-select button 15 is used to select one of the operating modes, for example, a still image photographing mode, a night scene photographing mode, a moving picture photographing mode, or a reproducing mode. The photograph information displaying unit 16 displays various information regarding each function related to photographing. The function-block button 18 is used to select one of the functions displayed on the photograph information display unit 16.

FIG. 2 is a rear view of the digital camera 1 of FIG. 1. Referring to FIG. 2, a speaker SP, a power button 31, a monitor button 32, an automatic focus lamp 33, a view finder 17b, a flash standby lamp 34, a color liquid crystal display (LCD) panel 35, a confirm/delete button 36, an enter/play button 37, a menu button 38, a wide-angle zoom button 39w, a telephoto zoom button 39t, an up-movement button 40up, a right-movement button 40ri, a down-movement button 40do, and a left-movement button 40le are included on the back of the digital camera 1.

The monitor button 32 is used to control the operation of the color LCD panel 35. For example, if the user presses the monitor button 32 a first time, an image of a subject and photographing information is displayed on the color LCD panel 35; when the monitor button 32 is pressed a second time, only the image of the subject is displayed on the color LCD panel 35; and when the monitor button 32 is pressed a third time, power supplied to the color LCD panel 35 is blocked. The automatic focus lamp 33 operates when an automatic focusing operation is completed. The flash standby lamp 34 operates when the flash 12 (see FIG. 1) is on standby. The confirm/delete button 36 is used as a confirm or delete button in the process in which a user sets one of the modes. The enter/play button 37 is used to input data or perform various functions such as stop or play in the reproducing mode. The menu button 38 is used to display a menu of a mode selected from the mode dial 14. The up-movement button 40up, the right-movement button 40ri, the down-movement button 40do, and the left-movement button 40le are used in the process in which a user selects one of the modes.

FIG. 3 is a view illustrating a structure of a surface of the digital camera 1 of FIG. 1 on which light is incident. FIG. 4 is a block diagram of the digital camera 1 of FIG. 1.

An optical system OPS including the lens unit 20 and a filter unit 41 optically processes light reflected from a subject. The lens unit 20 of the optical system OPS includes a zoom lens ZL, a focus lens FL, and a compensation lens CL.

If a user presses the wide-angle zoom button 39w (see FIG. 2) or the telephoto zoom button 39t (see FIG. 2) included in a user inputting unit INP, a signal corresponding to the wide-angle zoom button 39w or the telephoto zoom button 39t is input to a micro-controller 512. Accordingly, as the micro-controller 512 controls a lens driving unit 510, a zoom motor $M_z$ operates, thereby moving the zoom lens ZL. That is, if the wide-angle zoom button 39w is pressed, the focal length of the zoom lens ZL is shortened, and thus increases a viewing angle. On the other hand, if the telephoto zoom button 39t is pressed, the focal length of the zoom lens ZL is lengthened, and thus decreases a viewing angle. According to the above-mentioned characteristics, the micro-controller 512 can calculate a viewing angle based on the location of the zoom lens ZL from design data of the optical system OPS. Since the location of the focus lens FL is altered while the location of the zoom lens ZL is fixed, the viewing angle is hardly affected by the location of the focus lens FL.

When the focus on a subject is automatically or manually fixed, the current location of the focus lens FL changes with respect to a distance Dc to a subject. Since the location of the focus lens FL is changed when the location of the zoom lens ZL is fixed, the distance Dc to the subject is affected by the location of the zoom lens ZL. In the automatic focusing mode, the micro-controller 512 controls the lens driving unit 510, thereby driving a focus motor $M_F$. Accordingly, the focus lens FL moves from the very front to the very back. In this process, a number of steps of the location of the focus lens FL (e.g., a number of location steps of the focus motor $M_F$) are set at which an amount of high frequency in an image signal is increased the most.

The compensation lens CL is not separately operated since it acts to compensate for the overall refractive index.

A motor $M_A$ drives an aperture (not shown). A rotation angle of the aperture driving motor $M_A$ depends on whether the digital camera 1 is in a specified area exposure mode or in another mode. In the specified exposure mode, when a part of a subject region desired by a user coincides with a specified detected region displayed on the color LCD panel 35 of the digital camera 1, a light amount of the digital camera 1 is set to a mean brightness value of the specified detected region.

An optical low pass filter (OLPF) included in the filter unit 41 of the optical system OPS removes optical noise with a high frequency. An infrared cut filter (IRF) included in the filter unit 41 blocks infrared components of incident light.

A photoelectric converter OEC of a charge-coupled device (CCD) or a complementary metal oxide semiconductor (CMOS) (not shown) converts light from the optical system OPS into an electrical analog signal. Here, a digital signal processor (DSP) 507 controls a timing circuit 502 and controls the operation of the photoelectric converter OEC and a correlation double sampler and analog-to-digital converter (CDS-ADC) device 501. The CDS-ADC device 501, which is an ADC, processes the analog signal output from the photoelectric converter OEC, and converts it into a digital signal after removing high frequency noise from the analog signal and altering the bandwidth of the analog signal. The DSP 507 processes the digital signal from the CDS-ADC device 501, and generates a digital image signal divided into a chrominance signal and a luminance signal.

A light emitting unit LAMP that is operated by the micro-controller 512 includes the self-timer lamp 11, the automatic focus lamp 33 (see FIG. 2), and the flash standby lamp 34 (see FIG. 2). The user inputting unit INP includes the shutter button 13 (see FIG. 1), the mode dial 14 (see FIG. 1), the function-select button 15 (see FIG. 1), the function-block button 18 (see FIG. 1), the monitor button 32 (see FIG. 2), the confirm/delete button 36 (see FIG. 2), the enter/play button 37 (see FIG. 2), the menu button 38 (see FIG. 2), the wide-angle zoom button 39$w$ (see FIG. 2), the telephoto zoom button 39$t$, the up-movement button 40$up$ (see FIG. 2), the right-movement button 40$ri$ (see FIG. 2), the down-movement button 40$do$ (see FIG. 2), and the left-movement button 40$le$ (see FIG. 2).

The digital image signal output from the DSP 507 is temporarily stored in a dynamic random access memory (DRAM) 504. Algorithms needed for the operation of the DSP 507 and for setting data are stored in an electrically erasable and programmable read-only memory (EEPROM) 505. A memory card is inserted into a memory card interface (MCI) 506.

The digital image signal output from the DSP 507 is input to an LCD driving unit 514. As a result, an image is displayed on the color LCD panel 35.

The digital image signal output from the DSP 507 can be transmitted in a series communication via a universal serial bus (USB) connector 21$a$ or an RS232C interface 508 and its connector 21$b$, or can be transmitted as a video signal via a video filter 509 and a video outputting unit 21$c$.

An audio processor 513 outputs an audio signal from the microphone MIC to the DSP 507 or the speaker SP, and outputs an audio signal from the DSP 507 to the speaker SP.

The micro-controller 512 controls the operation of a flash controller 511 according to a signal output from the FS 19, and thus operates the flash 12.

FIG. 5 is a flowchart illustrating a method of controlling photographing of the micro-controller 512 illustrated in FIG. 4.

Referring to FIGS. 1 through 5, the shutter button 13 included in the user inputting unit INP has a two-step structure. That is, if a user presses the shutter button 13 to a first step after the user operates the wide-angle zoom button 39$w$ or the telephoto zoom button 39$t$, a first signal S1 output from the shutter button 13 is activated, and if the shutter release button 13 is pressed to a second step, a second signal S2 output from the shutter button 13 is activated. Therefore, the algorithm for controlling photographing illustrated in FIG. 5 starts when the shutter release button 13 is pressed up to the first step (Operation 101). Here, the current location of the zoom lens ZL is already set.

Remaining storage space of the memory card is detected (Operation 102), and it is determined whether the storage space is sufficient to record a digital image (Operation 103). If there is not enough storage space, a message indicating a lack of storage space in the memory card is displayed (Operation 104). If there is enough storage space, the following operations are performed.

Automatic white balance (AWB) is performed, and parameters related to the AWB process are set (Operation 105). Then, automatic exposure (AE) is performed in which a brightness of incident light is calculated, and the aperture driving motor $M_A$ is operated according to the calculated brightness amount (Operation 106). Then, automatic focusing is performed, and the location of the focus lens FL is set (Operation 107).

Then, it is determined whether a first signal S1, which is a signal generated when the shutter button 13 is at a first step, is activated (Operation 108). If the first signal S1 is inactivated, the user has no intention of photographing, and thus, a perform-program is terminated. If the first signal S1 is activated, the following operations are performed.

First, it is determined whether the second signal S2 is activated (Operation 109). If the second signal S2 is not activated, the user has not pressed the shutter button 13 to the second step for photographing, and thus the method moves to operation 106.

If the second signal S2 is activated, a photographing operation is performed since the user has pressed the shutter button 13 to the second step for photographing. That is, the micro-controller 512 operates the DSP 507, and the timing circuit 502 operates the photoelectric converter OEC and the CDS-ADS 501. Then, image data is compressed (Operation 111), and a compressed image file is generated (Operation 112). After the generated image-file is stored in the memory card via the MCI 506 from the DSP 507 (Operation 113), the method is completed.

For reference, Japanese Patent Publication No. hei 11-196301, titled "Electronic Camera Device," discloses an electronic camera device in which the state of an image, for example, a focusing or a shaking of the image at the moment of photographing, can be easily checked.

FIGS. 6A, 6B, 6B', and 6C are views illustrating a conventional method of controlling a digital photographing apparatus to enlarge an image to check a focus of the image.

Referring to FIGS. 6A, 6B, 6B', and 6C, in the conventional method of controlling the digital photographing apparatus, a predetermined region of an image displayed on an image displaying device 35 is set as a focus zone before photographing the image. After displaying an enlarged focus zone, a user focuses the image or presses a shutter switch to perform photographing.

To do so, first, a focus frame 61 for checking the focus of the image is displayed inside a monitor image 60 of the subject, which is displayed on the image displaying device 35, in a recording mode (FIG. 6A). Then, a portion of the image inside the focus frame 61 is automatically or manually at a command of the user enlarged, and displayed on the entire screen 62 or on a portion 63 of the screen (FIGS. 6B and 6B'). Then, the user checks whether the image is in focus by looking at the enlarged image, changes the focus if necessary, and performs photographing, and thus a photographed image 64 is displayed (FIG. 6C).

Image sensors used in digital photographing apparatuses have an increasing number of pixels due to advancements in technology, and the size of an LCD display window, which is an image displaying device, is becoming smaller due to the miniaturization of digital photographing apparatuses. Therefore, there is a large difference between the resolutions of the image sensor and the LCD display window, which is the image displaying device.

However, in the conventional method of controlling the digital photographing apparatus, the focus region is simply enlarged and displayed and resolutions of an image sensor and the image displaying device are not considered. Thus, it is difficult to achieve a good effect in the situation in which there is a large difference between the resolutions of the image sensor and the LCD display window as the image displaying device.

SUMMARY OF THE INVENTION

The present invention provides a method of controlling a digital photographing apparatus that can check the quality of a photographed image by enlarging a portion of the photographed image and displaying it on an image displaying device after photographing considering the difference between the resolution of an image sensor and the resolution of the image displaying device.

According to an aspect of the present invention, there is provided a method of controlling a digital photographing apparatus in which a portion of an input image is enlarged and displayed as a display image on an image displaying unit so that a user may determine the clarity of the input image, the digital photographing apparatus receiving the input image having a resolution of a first pixel number and displaying the display image on the image displaying unit having a resolution of a second pixel number. The method includes: receiving the input image; setting an enlarged display region that is to be enlarged from the input image, dividing the enlarged display region into at least two display images, and continually displaying the display images on the image display unit.

According to another aspect of the present invention, there is provided a method of controlling a digital photographing apparatus in which a portion of an input image is enlarged and displayed as a display image on an image displaying unit so that a user may determine the clarity of the input image, the digital photographing apparatus receiving the input image having a resolution of a first pixel number and displaying the display image on the image displaying unit having a resolution of a second pixel number. The method includes: receiving the input image; determining whether to enlarge the input image; setting a portion of the input image that is to be enlarged as an enlarged display region having a resolution of a third pixel number; calculating a number of display frames that are to be displayed on the image displaying unit by dividing the third pixel number by the second pixel number and rounding the result to an integer, and dividing the enlarged display region into the display images according to the number of the display frames; and displaying the display images on the image displaying unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The description of a digital photographing apparatus with reference to FIGS. 1 through 5 also applies to all digital photographing apparatuses in embodiments of the present invention.

Figure 1:
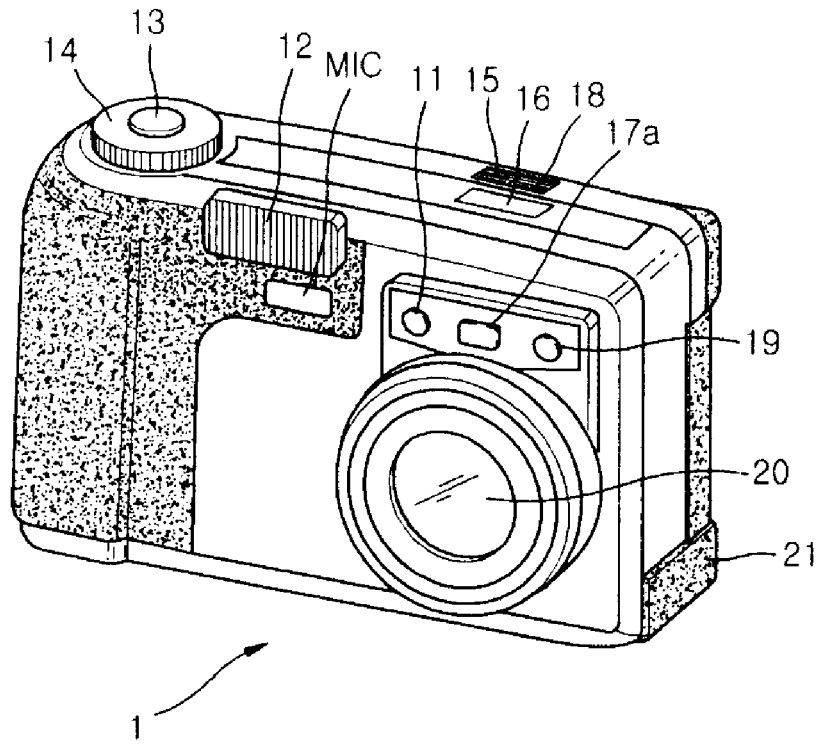
FIG. 1 is a front perspective view of a conventional digital camera.
Figure 2:
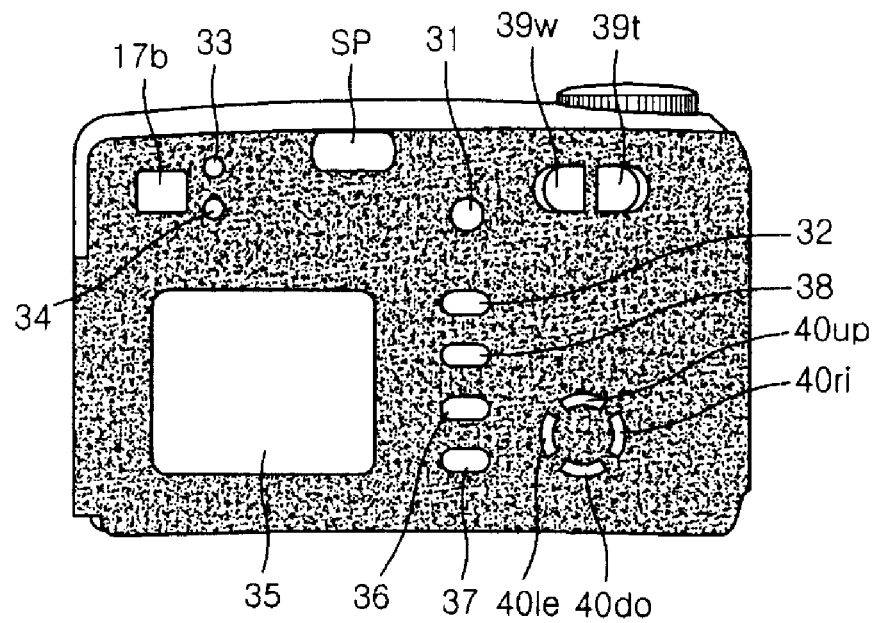
FIG. 2 is a rear view of the digital camera of FIG. 1.
Figure 3:
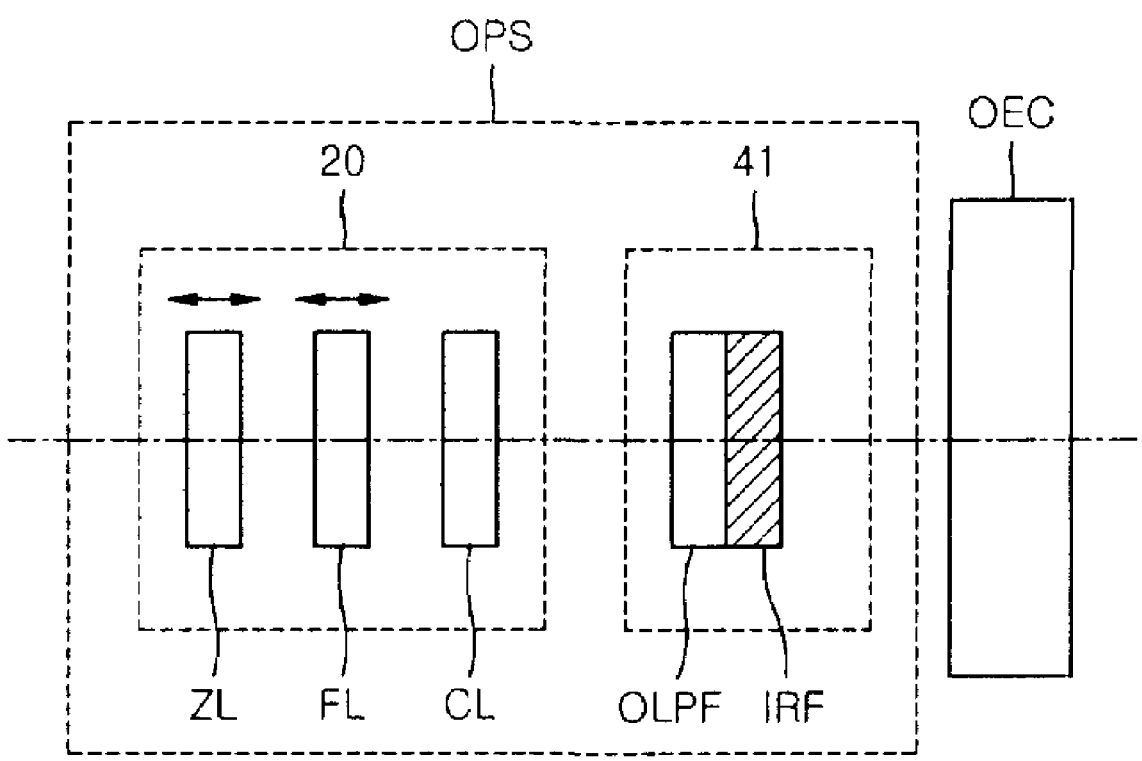
FIG. 3 is a view illustrating a structure of a surface of the digital camera of FIG. 1 on which light is incident.
Figure 4:
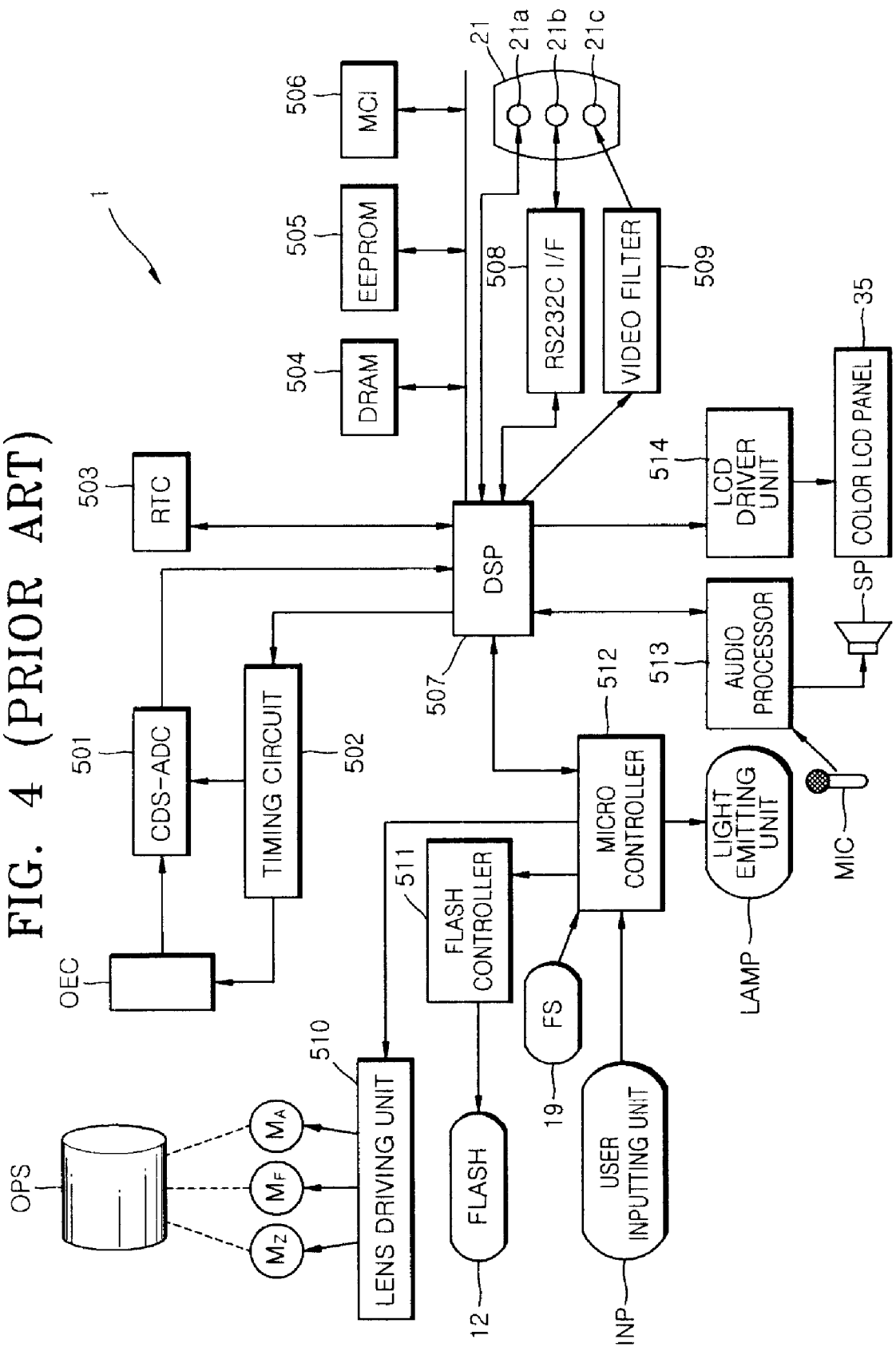
FIG. 4 is a block diagram of the digital camera of FIG. 1.
Figure 5:
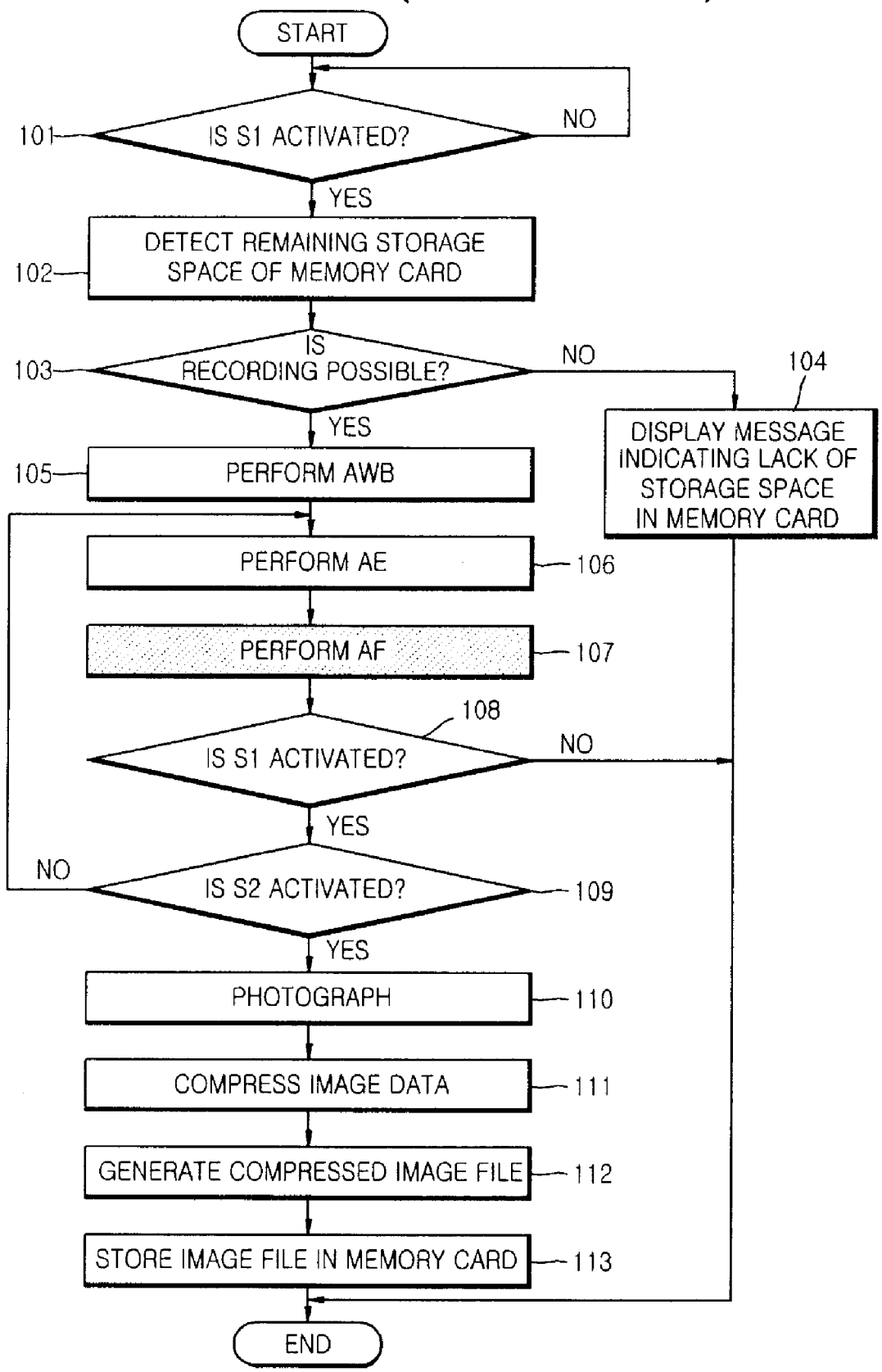
FIG. 5 is a flowchart illustrating a method of controlling photographing of a micro-controller illustrated in FIG. 4.
Figure 6A:
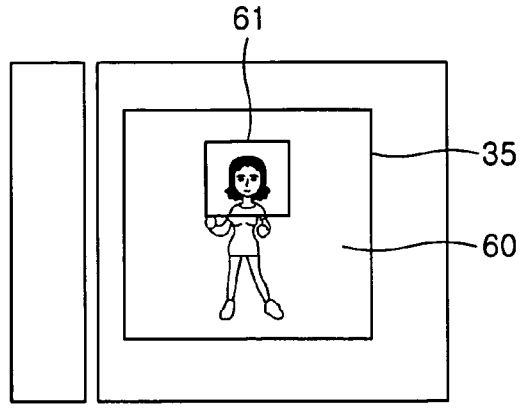
FIGS. 6A, 6B, 6B', and 6C are views illustrating a conventional method of controlling a digital photographing apparatus to enlarge a screen to check a focus of an image.
Figure 6B:
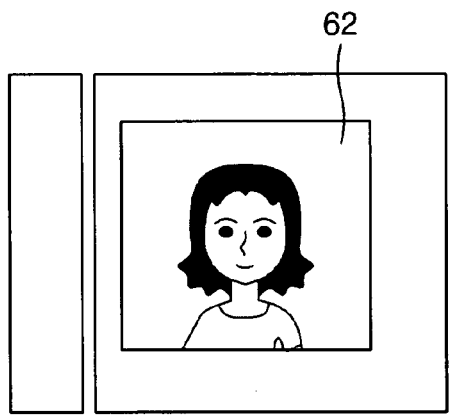
Figure 6B:
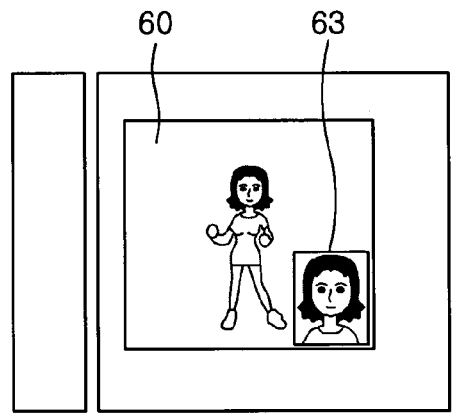
Figure 6C:
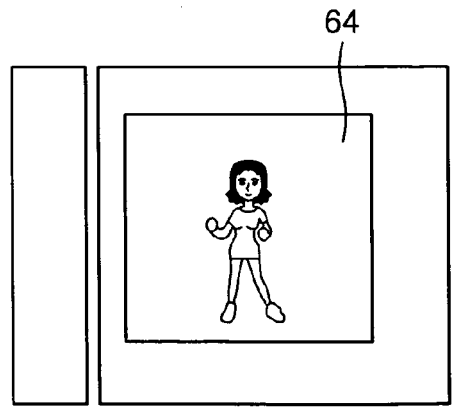
Figure 7:
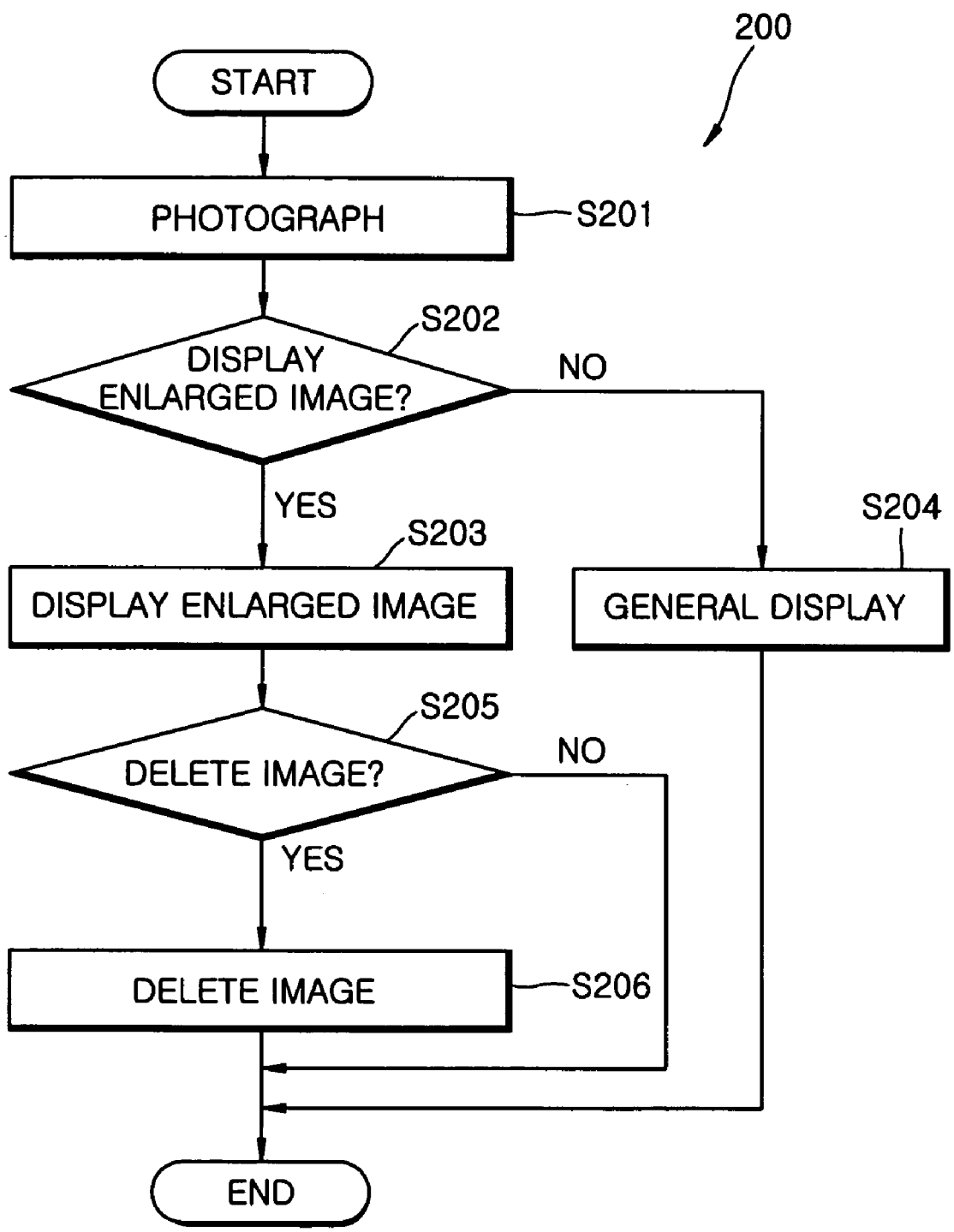
FIG. 7 is a flowchart illustrating a method of controlling a digital photographing apparatus according to an embodiment of the present invention.

FIG. 7 is a flowchart illustrating a method 200 of controlling a digital photographing apparatus according to an embodiment of the present invention.

Referring to FIG. 7, in the method 200, the digital photographing apparatus receives an input image having a first resolution and displays a display image on an image displaying unit having a second resolution. A portion of the input image is enlarged and displayed as the display image on the image displaying unit so that a user may determine the clarity of the input image.

To do this, the digital photographing apparatus receives an input image (S201). Then, a portion of the input image that is to be enlarged is set as an enlarged display region, the enlarged display region is divided into at least two display images, and the display images are continually displayed on an image displaying unit (S203). The method may further include an operation of determining whether to enlarge the input image (S202).

In the present embodiment, the input image is input from the outside by photographing in operation S201. The input image may be input via an image sensor (a charge-coupled device (CCD)) as in a conventional digital photographing apparatus, and the image sensor has a first resolution.

Although the input image is input from the outside by photographing in operation S201 in the present embodiment, an input image may be obtained from the outside from an external device, and the obtained image may be input as image data via a data input/output unit in operation S201. In this case, in order to apply the method 200 of controlling the digital photographing apparatus according to the present invention, the input image data has the first resolution.

In addition, the image data may be stored in a predetermined storage medium or a pre-photographed image may be stored as image data, and the stored input image may be checked by displaying the input image on the image displaying unit through the manipulation of the user. Operation S203 may be performed by the manipulation of the user that makes the input image to be displayed on the image displaying unit.

When desiring to display the photographed input image or the input image stored in the storage on the image displaying unit in advance, whether to display the enlarged input image or not may be set as a default.

In operation S202, when displaying the input image on the image displaying unit using a setting, whether to enlarge and display the image can be determined. In this case, when not enlarging and displaying the input image according to the determination result of S202, the input image having the first resolution is converted into an image having a second resolution and displayed on the image displaying unit in S204.

Since an image sensor used in a digital photographing apparatus usually has a higher number of pixels due to the advancement in technology, and the size of a liquid crystal display (LCD) display window, which is an image displaying device, is becoming more limited due to the miniaturizing of the digital photographing apparatus. Therefore, the first pixel number is higher than the second pixel number in many cases, and thus an input image with a high resolution is not properly displayed on the image displaying unit that has a lower resolution than the input image. Therefore, there is a limit in properly recognizing the clarity of the input image only with the image displayed on the image displaying unit.

The image displaying unit maybe a display device such as an LCD or an organic electro luminescent may be used. In the present embodiment, an LCD panel is used.

Figure 8:
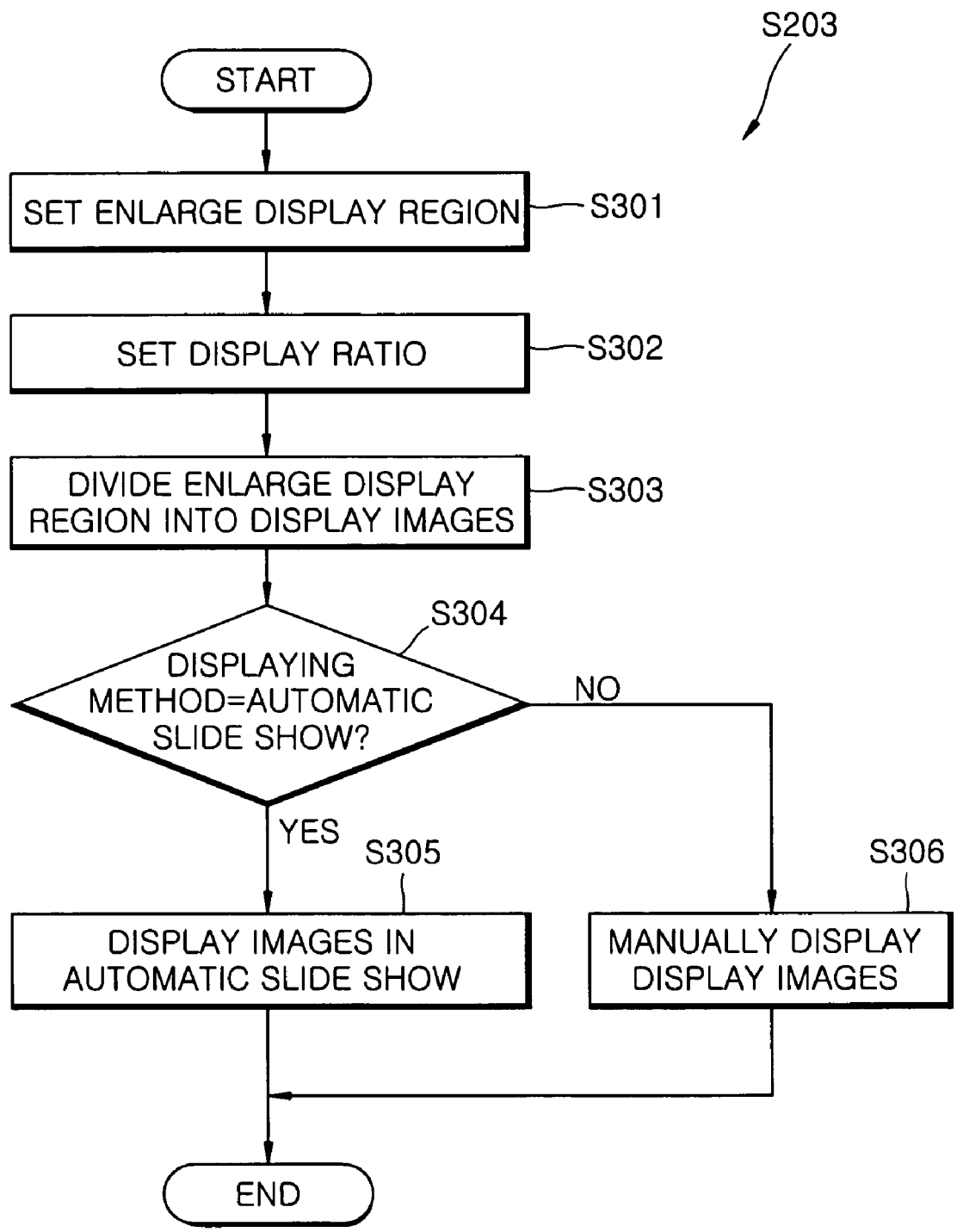
FIG. 8 is a flowchart illustrating a method of displaying an enlarged image in the method of controlling the digital camera illustrated in FIG. 7.

In operation S203, when enlarging and displaying the input image according to the determination result from operation S202, a portion of the input image that is to be enlarged is set as the enlarged display region. The enlarged display region is divided into at least two display images, and is continually displayed on the image displaying unit. The displaying of the enlarged input image in operation S203 will be described in more detail with reference to FIG. 8. In this case, each of the display images may be automatically displayed continually using an automatic slide show, as illustrated in FIG. 8.

In operation S203, one of the divided display images is displayed on the image displaying unit, and each of the display images selected by an input from the outside, for example, by the user, may be manually displayed.

Figure 9:
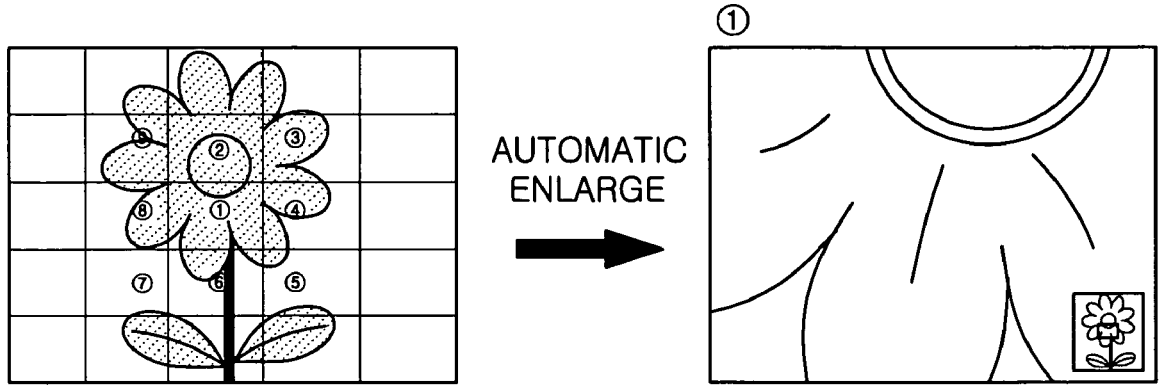
FIG. 9 is a view schematically illustrating the displaying of the enlarged image of FIG. 8.

When enlarging a portion of the input image and displaying it on the image displaying unit in operation S203, an entire input image may be reduced and displayed on a portion of the image displaying unit on which the display image is displayed. Here, the input image may be surrounded by, for example, a quadrangular line so that it is distinguishable from the display image. The reducing of the entire input image and displaying it on the portion of the image displaying unit is as illustrated in FIGS. 9 and 12.

The displaying of the entire input image on the portion of the image displaying unit is used to indicate which portion of the entire input image is currently displayed as the display image on the image displaying unit.

The enlarged display region of the input image is divided into at least two display images and displayed in operation S203 so that the user may determine the clarity of the input image from the display image displayed on the image displaying unit. Here, the clarity of the image may be affected by how much the focus, a white balance, an amount of exposure, the shaking of the hands etc., were controlled. If the clarity of the image is reduced, the quality of the image becomes poorer.

That is, when reproducing the photographed image on the image displaying unit and checking the photographed image in the present embodiment, the image is enlarged and reproduced in consideration of the resolution of the input image and the resolution of the image displaying unit, and thus making it easier for the user to determine the clarity of the input image. An image photographed when it is difficult to focus the image (e.g., when the hand shakes, the surrounding is dark, a manual focus is set, or a near subject is photographed) may be blurred. Even when the image appears to be well focused on the image displaying unit of the digital photographing apparatus, the clarity of the image may still be poor when displaying the image on an external displaying device having a much higher resolution than the image displaying unit.

In this case, a specific region (i.e., a focus zone) of the input image is enlarged and displayed to easily check the clarity of the input image, or the user may easily check the clarity of the input image using a digital zoom.

In addition, the method 200 of controlling the digital photographing apparatus may further include deleting the input image when the clarity of the display image is not satisfactory according to the determination of the user. That is, first, the specific region of the input image is enlarged and displayed so that the user may check the clarity of the input image. Then, when the input image does not have a satisfactory clarity according to the determination of the user and the user desires to delete the currently checked input image, the input image may be deleted.

Furthermore, after checking the clarity of the input image using the method 200 of controlling the digital photographing apparatus, a process of deleting the input image if the clarity of the display image is lower than a standard clarity may be performed automatically by the digital photographing apparatus. The clarity can be determined based on a focus, a white balance, an amount of exposure etc., and a satisfactory clarity may be pre-set as the standard clarity.

To do so, first, it is determined whether the input image is to be deleted by the selection of the user (S205). In the case it is set for the user to delete the input image, the input image is deleted (S206). The input image that does not have a desired quality is deleted so that a new input image may be obtained.

FIG. 8 is a flowchart illustrating the displaying the enlarged image (S203) in the method 200 of controlling the digital camera of FIG. 7. FIG. 9 is a view schematically illustrating the displaying of the enlarged image (S203) of FIG. 8.

Referring to FIGS. 7 through 9, in the method 200, the digital photographing apparatus receives the input signal having the first resolution and displays the display image on the image displaying unit having the second resolution. A portion of the input image is enlarged and displayed on the image displaying unit so that the user can determine the clarity of the input image.

The method 200 of controlling the digital photographing apparatus includes receiving the input image (S201), and determining whether to enlarge the input image (S202). The operation S203 of displaying the enlarged image includes setting a portion of the input image that is to be enlarged as an enlarged display region having a resolution of a third pixel number (S301); dividing the second pixel number by the third pixel number, rounding the result to the nearest integer, calculating the number of display frames that is to be displayed on the displaying unit, and dividing the enlarged display region into display images according to the number of the display frames (S303); and displaying each of the display images on the image display unit (S304, S305, and S306).

In operation S301, the portion of the input image that is to be enlarged is set as the enlarged display region, which has the resolution with the third number pixel. That is, the third pixel number expresses the size of the enlarged display region in pixel numbers.

The enlarged display region may be set in a variety of ways in operation S301. When enlarging and displaying the enlarged display region, a region in which the user can readily determine the clarity of the input image can be set as the enlarged display region. Here, the user may personally set the enlarged display region via a user input unit of the digital photographing apparatus.

As an example of the method of setting the enlarged display region of S301, an input image can be divided into at least two regions, and a region having the most edges may be set as an enlarged display region. That is, the divided regions are examined and a region with the most edge information is found and set as the enlarged display region.

Also in operation S301, when a face of a person is included in an input image, the face region may be set as the enlarged display region. Here, color information of the input image can be extracted and the face can be detected by comparing the color information with a face tone of a general person, and it can be determined whether the face of a person is included in the input image.

According to another embodiment of the present invention, in the method of setting the enlarged display region of S301, a focus zone for adjusting a focus when automatically focusing, which is used in a conventional method of controlling a digital photographing apparatus, may be set as an enlarged display region.

Figure 10:
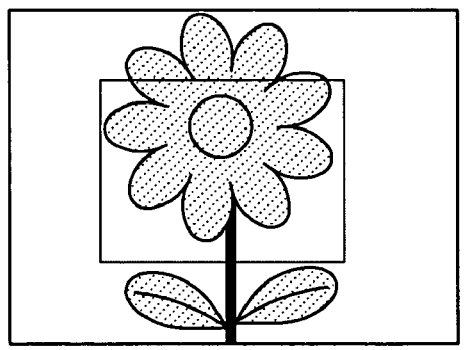
FIG. 10 is a view illustrating a setting of an enlarged display region in the displaying of the enlarged image described in FIG. 8

FIG. 10 is a view illustrating the setting of the enlarged display region (S301) in the displaying of the enlarged input image described in FIG. 8. In the present embodiment, the whole input image is displayed on the image displaying unit, and the user may select how far a region to be enlarged and displayed is from the center of the input image. For example, a region corresponding to, for example, 1/9, 1/16, and 1/25 region from the center of the input image may be selected as an enlarged display region.

In operation S303, the enlarged display region set in operation S301 is divided into at least two display images. A number of display frames that are to be formed is calculated from the third pixel number of the enlarged display region and the second pixel number of the image displaying unit, and the enlarged display region is divided into equal number of display images and display frames. Here, the number of display frames can be calculated by dividing the third pixel number by the second pixel number and rounding the result into an integer. The result can be rounded to the nearest whole number, rounded up or rounded down.

Also, the method 200 of controlling the digital photographing may further include setting a displaying ratio of a pixel number of an input image that is to be displayed on the image displaying unit and a pixel number of a display image that is displayed on the image displaying unit (S302). Here, the displaying ratio may be a ratio of a pixel number of an input image that is to be displayed on the image displaying unit and a pixel number of a display image that is displayed on the image displaying unit in which 1:1 displaying ratio is preferable.

Operation S302 is further included in case the user desires to check a further enlarged image simultaneously, and thus the user may select to perform operation S302. For example, the display ratio may be 1:1, 2:1, 3:1, . . . , n:1, or set by the user.

Figure 11:
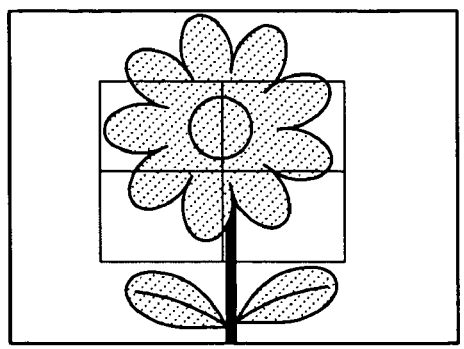
FIG. 11 is a view illustrating dividing of the enlarged display region into display images in the displaying of the enlarged image described in FIG. 8.
Figure 12A:
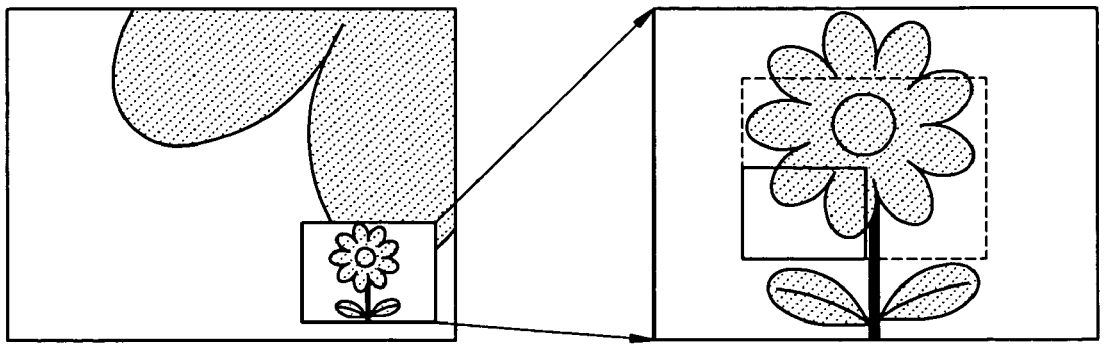
FIGS. 12A through 12D are views illustrating the displaying of the respective divided display images in FIG. 11 in an automatic slide show.
Figure 12B:
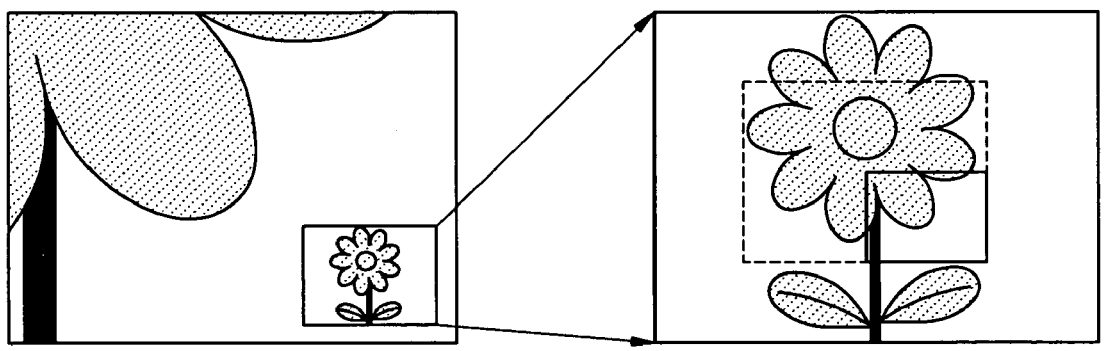
Figure 12C:
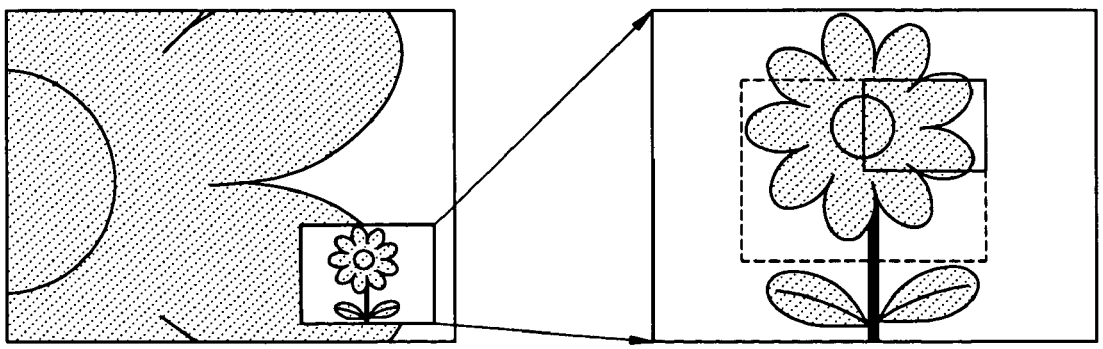
Figure 12D:
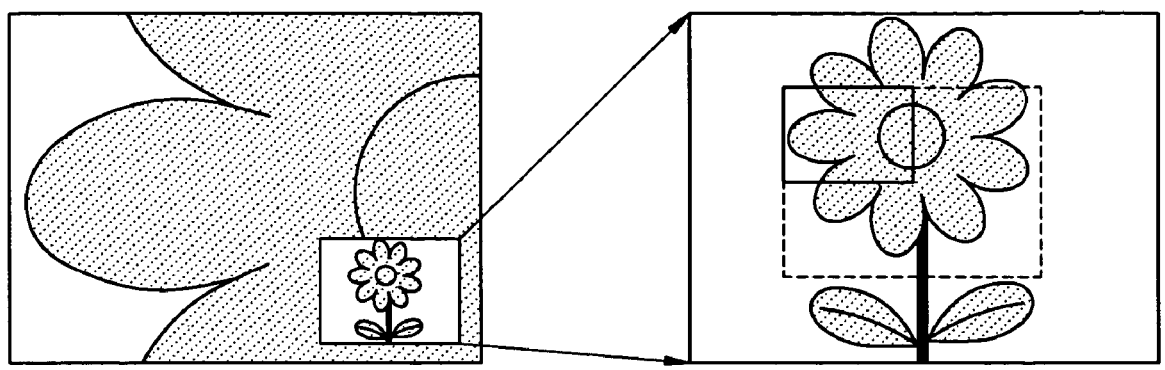

FIG. 11 is a view illustrating the dividing of the enlarged display region into display images in the displaying of the enlarged input image described in FIG. 8. In this case, when further including operation S302, the number of the display frames is calculated by dividing the third pixel number by the second pixel number, multiplying the result by a display ratio n, and then rounding the result into an integer in operation S303.

Here, it may be difficult to reproduce the set enlarged display region in the selected display ratio in a single operation. For example, when 2/5 of an input image is selected to be displayed after being enlarged in a 1:1 ratio, when the size of the input image is 1,000,000 pixels and the size of an LCD is 100,000 pixels, 2/5 of the 1,000,000 pixels, that is, 400,000 pixels, is divided into four display frames, each having 100,000 pixels, and the four display frames are reproduced.

The display images are displayed on the image displaying unit in operations S304, S305, and S306. In operation S304, a method of displaying the display images is determined, in operation S305, the display images are displayed in an automatic slide show, and in operation S306, the display images are manually displayed.

In operation S304, whether to display the display images in the automatic slide show or manually display the display images is determined from a default setting. When photographing using the digital photographing apparatus and checking the photographed image, a user may select whether to use a function in which an enlarged display region is automatically enlarged according to a photographing condition.

In operation S305, the display images are sequentially displayed on the image displaying unit when the automatic slide show is selected in operation S304.

The configuration of enlargement reproduction, the enlarged display region, the enlargement ratio, the method of displaying, etc. is set by a user with a menu. If the enlarged display function is to be performed on the enlarged display region of a photographed image, the image is photographed as described in FIG. 8, immediately an entire image is briefly shown, and the enlarged display region is enlarged and displayed according to the settings. Here, the enlarged display function performed on the enlarged display region is selected when a photographing condition is in a manual focus control mode, when a near subject is being photographed, when photographing using a telephoto zoom, when over 1/30 second of exposure is needed, etc.

In operation S305, it is preferable that a display image at the center of the enlarged display region is displayed on the image displaying unit, and the display images in the clockwise direction are sequentially displayed on the image displaying unit in the enlarged display region. In FIG. 9, which schematically illustrates the displaying of the enlarged image (S203) described in FIG. 8, an entire input image is divided into regions using vertical and horizontal lines as shown, and regions labeled 1 through 9 sequentially are set as the enlarged display region.

In each of operations S305 and S306, region 1 is first enlarged and displayed on the entire image displaying unit. In operation S305, display images of region 1 through 9 are sequentially displayed on the entire image displaying unit, which is in the clockwise direction from the center of the image displaying unit.

FIGS. 12A through 12D are views illustrating the displaying of the respective divided display images in FIG. 11 in the automatic slide show. The region of the entire input image that is divided by dotted lines forming a quadrangle at the center thereof according to a setting is set as the enlarged display region. Then, the enlarged display region is divided into regions by horizontal and vertical lines.

The display images shown in FIGS. 12A through 12D are sequentially displayed on the entire image displaying unit in operation S305. In this case, the display images are sequentially displayed in the counterclockwise direction. Also, when displaying the display images on the image displaying unit using the automatic slide show, the slide show may stop if an interruption occurs in the middle of the slide show.

In operation S306, when manually displaying the display images according to the determination result in operation S304, one of the divided display images is displayed on the image displaying unit, and each of the display images selected by external input is displayed. When manually displaying the display images according to the external input, a region selected by the user may be displayed and not the images in display frame units which are formed in operation S303.

That is, when manual display is selected, a center frame is reproduced and an image may be displayed in a pre-set pitch units, and not frame units, by moving the enlarged display region little by little to a desired direction using user operating keys.

As illustrated in FIGS. 9 and 12A through 12D, when enlarging a portion of the input image and displaying the display images on the image displaying unit in operations S305 and S306, the entire input image can be reduced and displayed on a portion of the image displaying unit on which the display images are displayed. The reduced entire input image can be surrounded by, for example, a quadrangular line so that it is distinguishable from the display image. The reduced entire input image is displayed to indicate which part of the entire input image the display image is taken from and displayed on the image displaying unit.

In addition, the method 200 of controlling the digital photographing apparatus can be adopted in a digital photographing apparatus according to an embodiment the present invention.

As described above, in a method of controlling a digital photographing apparatus according to the present invention, a portion of a photographed image is enlarged and displayed on an image display device in consideration of a difference in a resolution of an image sensor and a resolution of the image displaying device. Thus, a user may check the quality of the photographed image and may conveniently determined whether the photographed image has the quality the user desires. In addition, the user may easily determine, for example, the clarity of the photographed image or whether the photographed image is well focused.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus in which a portion of an input image is enlarged and displayed as a display image on an image display unit so that a user may determine the clarity of the input image, the digital photographing apparatus receiving the input image having a resolution of a first pixel number and displaying the display image on the image display unit having a resolution of a second pixel number, the method comprising:
   receiving the input image;
   determining whether to enlarge the input image;
   setting a portion of the input image that is to be enlarged as an enlarged display region having a resolution of a third pixel number;
   calculating a number of display frames that are to be displayed on the image display unit by dividing the third pixel number by the second pixel number and rounding the result to an integer, and dividing the enlarged display region into the display images according to the number of the display frames;
   determining a method of displaying the display image on the image display unit from a default setting; and
   sequentially displaying the display images on the image display unit according to the determined method of displaying.

2. The method of claim 1, wherein, in the sequentially displaying the display images, the display image at the center of the enlarged display region is displayed on the image display unit, and then the display images located around the center of the enlarged display region are sequentially displayed on the image display unit in a clockwise or counterclockwise direction.

3. The method of claim 1, further comprising dividing the input image into at least two regions, and setting a region with the most number of edges among the divided regions as the enlarged display region.

4. The method of claim 1, further comprising setting the portion of the input region that is to be enlarged as the enlarged display region according to an instruction by the user.

5. The method of claim 1, further comprising determining whether the face of a person is included in the input image and, if so, setting the region of the face as the portion of the input region that is to be enlarged as the enlarged display region.

6. A digital photographing device for enlarging and displaying a portion of an input image as a display image on an image display unit so that a user may determine the clarity of the input image, the digital photographing device receiving the input image having a resolution of a first pixel number and displaying the display image on the image display unit having a resolution of a second pixel number, the device comprising:
   a mechanism for receiving the input image;
   an image display unit;
   means for determining whether to enlarge the input image;
   means for setting a portion of the input image that is to be enlarged as an enlarged display region having a resolution of a third pixel number;
   means for calculating a number of display frames that are to be displayed on the image display unit by dividing the third pixel number by the second pixel number and rounding the result to an integer, and dividing the enlarged display region into the display images according to the number of the display frames;
   means for determining a method of displaying the display image on the image display unit from a default setting; and
   means for sequentially displaying the display images on the image display unit according to the determined method of displaying.

7. The device of claim 6, further comprising means for dividing the input image into at least two regions, and setting a region with the most number of edges among the divided regions as the enlarged display region.

8. The device of claim 6, further comprising means for setting the portion of the input region that is to be enlarged as the enlarged display region according to an instruction by the user.

9. The device of claim 6, further comprising means for determining whether the face of a person is included in the input image and, if so, setting the region of the face as the portion of the input region that is to be enlarged as the enlarged display region.

10. The device of claim 6, wherein, in the means for sequentially displaying the display images, the display image at the center of the enlarged display region is displayed on the image display unit, and then the display images located around the center of the enlarged display region are sequentially displayed on the image displaying unit in a clockwise or counterclockwise direction.

* * * * *